United States Patent [19]

Kennedy et al.

[11] Patent Number: 5,490,209
[45] Date of Patent: Feb. 6, 1996

[54] AUTOBAUD RATE DETECTION MECHANISM

[75] Inventors: Michael Kennedy, Ventura; Onofrio Schillaci, Camarillo, both of Calif.

[73] Assignee: Harris Corporation, Melbourne, Fla.

[21] Appl. No.: 193,813

[22] Filed: Feb. 9, 1994

[51] Int. Cl.[6] .................................................. H04M 11/00
[52] U.S. Cl. ................................................ 379/97; 375/231
[58] Field of Search .......................... 379/93, 94, 96–100; 375/8, 13, 34, 58; 358/405, 406, 434, 435, 486

[56] References Cited

U.S. PATENT DOCUMENTS

| | | | |
|---|---|---|---|
| 4,153,916 | 5/1979 | Miwa et al. | 358/406 |
| 4,418,322 | 11/1983 | Chang | 331/1 |
| 4,606,044 | 8/1986 | Kudo | 375/58 |
| 4,630,126 | 12/1986 | Kaku et al. | 375/58 |
| 5,008,902 | 4/1991 | Key et al. | 375/10 |
| 5,159,465 | 10/1992 | Maemura et al. | 358/405 |
| 5,202,899 | 4/1993 | Walsh | 375/8 |
| 5,202,963 | 4/1993 | Zelley | 379/94 |

*Primary Examiner*—Wing F. Chan
*Attorney, Agent, or Firm*—Charles E. Wands

[57] ABSTRACT

An autobaud detection mechanism, installed as part of the communication control software of a serial communication device's microcontroller, enables the device to automatically determine the baud rate employed by a remote digital data communications device. Starting with a default baud rate, corresponding to the highest available baud rate, the mechanism steps through successively lower baud rates in the course of a search for the baud rate at which the remote device is transmitting. When an incoming call is received, respective bits of the received data are examined for the presence of transmission errors. If a transmission error is detected, the baud rate is stepped to the next lowest baud rate. If no error is detected, the received data bits are compared with a reference character. If the two compared data bit patterns match, the controller locks the baud rate at that baud setting for the remainder of the call. When the call is terminated, the baud rate reverts to its default setting. If the bit pattern comparison does not indicate a match, the baud rate is stepped to the next lowest baud rate. When the autobaud detection routine has stepped to a new baud rate entry, it initiates a prescribed time-out as a safeguard against the receiver becoming 'out-of-sync' with a transmitter. Once, the lowest baud rate has been reached, the routine steps to the default setting and starts again.

12 Claims, 1 Drawing Sheet

AUTOBAUD RATE DETECTION MECHANISM

FIELD OF THE INVENTION

The present invention relates in general to communication systems, such as telephone systems, and is particularly directed to a mechanism for enabling a digital data communications device, such as a serial input/output device (SIO), universal asynchronous receiver/transmitter (UART), etc., that may be associated with a telephone line test, conditioning and reporting unit, to automatically tune itself to the baud rate of a received digital data message.

BACKGROUND OF THE INVENTION

Digital data communications devices customarily employ one or more serial ports through which digital data messages are interfaced between a resident signalling processor and a serial data communications link to which a remote terminal device is coupled. Because digital data communications may be conducted at a number of different baud rates (e.g. 1200, 2400, 4800, 9600 baud), such devices customarily employ one or both of a software routine and panel DIP (dual in-line packaging) switch through which a user, knowing the baud rate at which communications with a remote terminal device are to be conducted, loads a selected baud rate into an internal register for use by an attendant modem.

Unfortunately, there are variety of applications of digital communications devices, which are to be remotely accessed, in order that an attendant utility device may be conditioned and controlled, without the availability of technical personnel having prior knowledge of the baud rate used by the remote. A non-limitative example of such an application is diagrammatically illustrated in FIG. 1, which shows the distribution of a plurality of remote test equipments or measurement units 11 for monitoring and testing network lines 13 and (subscriber) termination equipment 15 remotely from one or more data terminal units (DTUs) 21, which have the capability of accessing the remote test equipments 11 through attendant modem devices 23, 24 that are linked to a central office 25.

Because the baud rates of the remote data terminal units which may access such equipments are not necessarily known at the time of installation, and indeed can be expected to vary from unit to unit, it is necessary to have a craftsperson perform-on-site (trial and error) adjustment of control switch settings. Moreover, where a remotely accessible piece of equipment contains multiple serial ports, the overall hardware complexity (and therefore cost) of affording baud rate adjustment for each serial port is substantially increased.

SUMMARY OF THE INVENTION

In accordance with the present invention, the above described shortcomings of conventional baud rate setting and adjustment schemes, which require the participation of technical personnel to determine and then perform parameter adjustments of the control settings of the terminals units are effectively obviated by what may be termed an 'autobaud' detection mechanism, which is installed as part of the communication control software of the serial communication device's microcontroller, and which enables the microcontroller to automatically determine the baud rate employed by a remote digital data communications device, so that the baud rate of the internal modem of the unit may be readily set and locked to that baud rate.

More particularly, rather than employ conventional baud-setting switches through which baud rate must be set by an on-site craftsperson, the present invention employs a table of baud rate entries (e.g. 9600, 4800, 2400, 1200, 600, 300), at each of which the terminal unit's serial communication device (modem) is capable of operating. Because the baud rate table is microcontroller-resident, it is programmable, so that the tuning capabilities of the serial input output device may be updated, for example by the replacement of a modem card capable of handling a prescribed set of baud rates with a more enhanced modem card having an expanded set of baud rates.

Pursuant to the invention the highest baud rate within the table is the default baud rate, which the detection mechanism employs when initiating a baud rate detection routine in response to an incoming call. The routine is operative to step through successively lower baud rates from the highest baud rate in the course of a search for the baud rate at which the remote device is transmitting. The baud rate entries of the table are stored in sequential addresses in memory, which may be scanned by an associated soft-counter which controls baud rate entry access, the soft-counter rolling over to the highest entry once it has stepped to the lowest entry address. This roll-over to the default entry ensures that the search will not become 'hung up' on any baud rate.

When an incoming call is received, and the terminal device goes off-hook, the respective bits of the received data (a potentially valid character, such as a carriage return) are stored, and the received data bit pattern is analyzed for the presence of transmission errors, such as framing, parity and overrun. If a transmission error is detected, then it is inferred that what has been received is not a valid character at the current (default) baud rate setting. The routine then increments the baud rate table address counter so as to step to the next lowest baud rate entry in the table.

If, on the other hand no transmission error has been detected, it is inferred assumed that what has been received is a potentially valid character at the present baud rate setting, and the stored data bits are compared with a prescribed reference character (e.g. carriage return). If the serial bit compositions of the two compared data bit patterns match, it is inferred that the remote site is transmitting at the current baud setting, and the microcontroller locks the modem baud rate at that baud setting for the remainder of the call. When the call is terminated and the device logs off into an idle state, the baud rate reverts to its default setting. If the bit pattern comparison does not indicate a match, it is inferred that the remote site is not transmitting at the current baud setting, and the routine increments the baud rate table address counter to step to the next baud rate entry in the table.

When the autobaud detection routine has stepped to a new baud rate entry, it initiates a prescribed time-out (e.g. five seconds) as a safeguard against the receiver becoming 'out-of-sync' with a transmitter, whose baud rate is faster than that to which the receiving serial device is currently set. Within this time period, if the receiving serial device does not receive a further character bit pattern, it reverts to the default setting, thereby reinitiating the baud rate detection process. The length of the time out period is based upon the lowest baud rate available, and is no less than the minimum character receive time for the lowest baud rate entry and allowing for character separation for every incoming character in order to ensure proper character identification. Customarily, the user at the remote end repeatedly asserts the character (hits the carriage return key), to establish a connection at any of the available baud rates. When a new character pattern is received within the time out window (which is normally the case), the routine checks the contents of the character for transmission errors, and the process proceeds as described above.

Eventually, the autobaud detect routine will have stepped to the baud rate being transmitted, and will have captured and matched the connectivity character at the proper baud rate. If a transmission error occurs, it may be necessary to restep through the baud rate table entry sequence. However, with the wrap around feature of the table entry addressing scheme, it is ensured that the process will not hang up on any particular baud rate.

DETAILED DESCRIPTION

Figure 1:
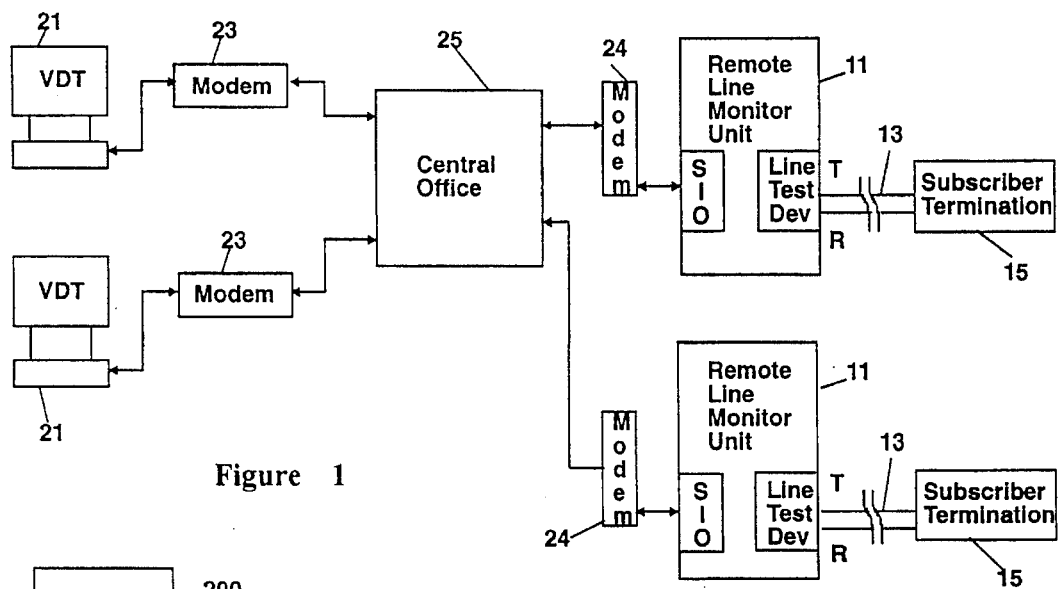
FIG. 1 diagrammatically illustrates a telephone network having a plurality of distributed remote test equipments that are linked to supervisory data terminal units by way of a central office.

Before describing in detail the autobaud detection mechanism in accordance with the present invention, it should be observed that the invention resides primarily in what is effectively a prescribed augmentation of the communication control software of the serial communication device's microcontroller, which enables the microcontroller to automatically determine the baud rate employed by a remote digital data communications device, so that the baud rate of the internal modem of the unit may be readily set and locked to that baud rate for the duration of the communication. The details of the circuitry of the serial communication devices are otherwise essentially unaffected. Consequently, the configuration of such devices and the manner in which they are interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood. The autobaud detection mechanism of the present invention will be described with reference to FIG. 2 which is a communications signal processing flow routine through which the baud rate of a remote message-sourcing terminal may be automatically determined.

As pointed out briefly above, rather than employ baud-setting switches through which baud rate may be set by craftsperson intervention, the present invention employs a set or table of baud rate entries, at any of which the terminal unit's serial communication device (modem) is capable of operating. Because the baud rate table is microcontroller resident, it is programmable, so that the autobaud detection mechanism may be updated as the communication capabilities of the terminal unit change, for example by the replacement of a modem card capable of handling a prescribed set of baud rates with a more enhanced modem card having an expanded set of baud rates.

Figure 2:
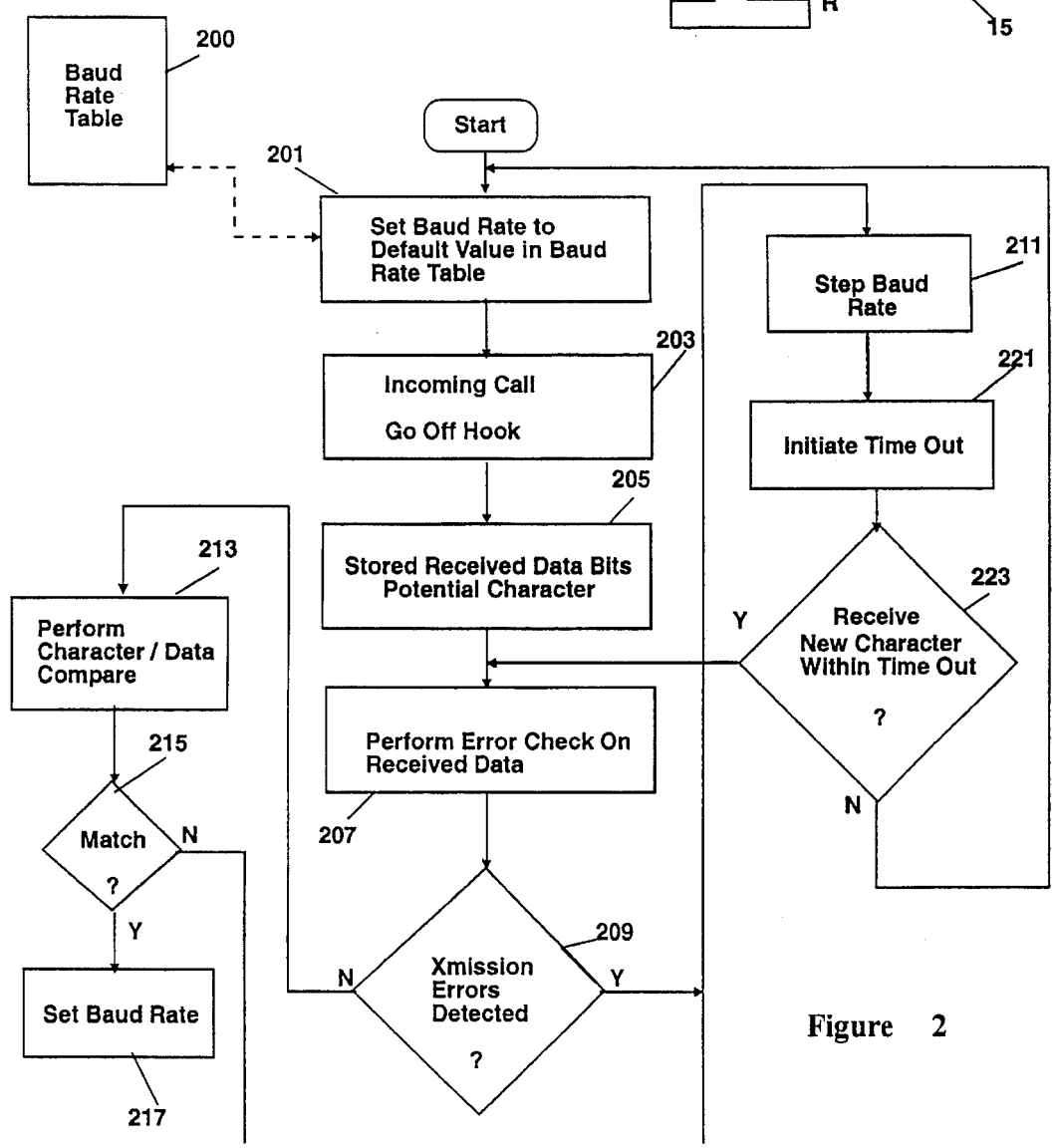
FIG. 2 is a flow chart of the digital communications processing routine employed by the autobaud detection mechanism in accordance with the present invention.

Referring now to FIG. 2, which shows respective steps of the communications processing routine of autobaud detection mechanism in accordance with the present invention, the baud detection process begins at step 201, with the serial communications device (e.g. UART, SIO, etc,) in an IDLE or ON-HOOK mode. During this state, the microcontroller of the device defaults to the highest baud rate in its baud rate table, shown at 200. In order to facilitate stepping through successively lower baud rates, the baud rate entries may be stored in sequential addresses in memory, with an associated soft-counter which controls baud rate entry access rolling over to the highest entry once it has stepped to the lowest entry address, so that the baud rate access mechanism is operative to 'wrap around' on itself, and therefore does not become 'hung up' on any particular (the lowest) baud rate. For purposes of an illustrative example, the baud rate entry table may contain four baud rates (1200, 2400, 4800 and 9600). Thus, the default entry for this example is 9600 baud.

When an incoming call is received, and the terminal device goes off-hook, as shown at step 203, the respective bits of one or more potentially valid characters employed to establish communications between terminal units are stored in a register or section of memory dedicated to character matching, as will be described. For purposes of the present description, as a non-limitative example, and keeping with currently accepted practice in establishing and confirming connectivity between a data-sourcing site (calling party) and a data destination site (called party), a carriage return character (ENTER=ASCII 13) is employed as the character to be transmitted and identified for baud rate detection.

As data bits of a potentially valid character are received and stored (step 205), they are analyzed by the serial communications device for the presence of transmission errors, for example—framing, parity and overrun, as shown at step 207. If a transmission error is detected (the answer to step 209 is YES), it is inferred that the received bit pattern is not a valid character at the present baud rate setting (as determined by the currently accessed baud rate entry in Table 200), and the routine transitions to step 211, which increments the baud rate table address counter so as to step to the next lowest baud rate entry in the table. Starting with a default setting of 9600 for the idle state, step 211 proceeds to the next lowest baud rate of 4800 baud in the present example.

If, on the other hand, no transmission error has been detected (the answer to step 209 is NO), it is inferred that the received bit pattern corresponds to that of a potentially valid character at the present baud rate setting, and the routine transitions to step 213, which compares the stored bits of the character string with a prescribed reference character (a carriage return, in the present example). If the serial bit compositions of the two compared characters are identical (the answer to step 215 is YES), then it is inferred that the remote site is transmitting at the current baud setting, and the microcontroller locks the modem baud rate at that baud setting for the remainder of the call (step 217). When the call is terminated and the device logs off into an idle state, the baud rate reverts to its default setting (9600 baud in the present example, as shown at step 201).

If the result of comparison step 215 is NO, indicating that the serial bit composition of the received character is not a complete character (including necessary stop bits) identical to the stored reference character, then it is inferred that the remote site is not transmitting at the current baud setting, and the process transitions to step 211, which, as noted above, increments the baud rate table address counter to step to the next baud rate entry in the table.

When the autobaud detection routine has stepped to a new baud rate entry, it initiates a prescribed time-out (e.g. five seconds) shown at step 221, as a safeguard against the receiver becoming 'out-of-sync' with a transmitter, whose baud rate is faster than that to which the receiving serial device is currently set. As shown by step 223, within this time period the receiving serial device must receive a further character for analysis (the answer to step 223 is YES); otherwise (the answer to step 223 is NO) it reverts to the default setting, thereby reinitiating the baud rate detection process (step 201). The period of time prescribed in step 223 is based upon the lowest baud rate available, and is no less than the minimum character receive time for the lowest baud rate entry and allowing for character separation for every incoming character in order to ensure proper character identification. Customarily, the user at the remote end repeatedly asserts the character (hits the carriage return key), to establish a connection at any of the available baud rates. For a character received within the time out window (the answer to step 223 is YES), which is normally the case, the routine transitions to step 207, which checks the contents of the character for transmission errors, and the process proceeds as described above.

Eventually, the autobaud detect routine of FIG. 2 will have stepped to the baud rate being transmitted, and captured and matched the connectivity character at the proper baud rate. As noted above, if a transmission error occurs, it may be necessary to restep through the baud rate table entry sequence. However, with the wrap around feature of the table entry addressing scheme, it is ensured that the process will not hang up on any particular baud rate. Once the answer to step 215 is YES, indicating that the remote site is transmitting at the current baud setting, the microcontroller locks the modem baud rate at that baud setting for the remainder of the call (step 217).

As will be appreciated from the foregoing description, the need participation of technical personnel to determine and then perform parameter adjustments of the control settings of a data terminals unit of a conventional baud rate setting and adjustment scheme are effectively obviated by the autobaud detection mechanism of the present invention, which is readily installed as part of the communication control software of the serial communication device's microcontroller, and enables the microcontroller to automatically determine the baud rate employed by a remote digital data communications device, so that the baud rate of the internal modem of the unit may be readily set and locked to that baud rate.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a serial data communications device having a serial port through which digital data messages are interfaced between a resident communications controller and a serial data communications link, to which a remote terminal device is coupled, a mechanism for establishing the baud rate of said serial communications device at the baud rate of a digital data message received from said remote terminal device comprising the steps of:

(a) initially setting the baud rate of said serial communications device to a default baud rate corresponding to the highest baud rate at which said serial communications device is operative to communicate with a remote terminal device;

(b) in response to an incoming call from a remote terminal device, examining respective bits of a received digital data stream for the presence of transmission errors;

(c) in response to step (b) detecting the presence of a transmission error, changing the baud rate from its current baud rate to a baud rate lower than the current baud rate, and monitoring said serial data communications link for digital data transmitted from said remote terminal device at said lower baud rate, but otherwise comparing the bit contents of said received digital data stream with a digital bit pattern associated with a prescribed reference character; and (d) in response to step (c) detecting a match between said received digital data stream and said digital bit pattern associated with said prescribed reference character, setting the baud rate of said serial communications device at the current baud setting for the remainder of the call, but otherwise changing the baud rate from its current baud rate to said lower baud rate, and repeating steps (b)–(d), until step (d) sets the baud rate of said serial communications device for the remainder of the call.

2. A method according to claim 1, wherein, in said baud rate changing steps (c) and (d), in response to said current baud rate being the lowest baud rate at which said serial communications device is operative to communicate with a remote terminal device, changing the current, lowest baud rate to said default highest baud rate.

3. A method according to claim 1, wherein, in each of steps (c) and (d), upon changing the baud rate from its current baud rate to said lower baud rate, initiating a time-out period, and repeating steps (b)–(d) only in response to the receipt of a further digital message from said remote terminal within said time-out period, but otherwise changing the baud rate from its current baud rate to said default baud rate of step (a) and repeating steps (b)–(d).

4. A method according to claim 3, wherein said time-out period is no less than the minimum character receive time for the lowest baud rate entry, allowing for character separation for every incoming character in order to ensure character identification in step (c).

5. A method according to claim 1, wherein step (a) includes the step of storing a plurality of baud rate representative codes associated with those baud rates at which said serial communications device is capable of communicating with a remote terminal device, and setting the default baud rate of said serial communications device to the highest baud rate at which said serial communications device is capable of communicating with a remote terminal device.

6. A serial data communications device having a serial port through which digital data messages are interfaced between a resident communications controller and a serial data communications link, to which a remote terminal device is coupled, said communications controller having its baud rate initially set to a default baud rate corresponding to the highest baud rate at which said serial communications device is capable of communicating with a remote terminal device, and being operative to establish the baud rate of said serial communications device at the baud rate of a digital data message received from said remote terminal device by means of a baud rate establishing routine which is operative to execute the following steps:

(a) in response to an incoming call from a remote terminal device, examining respective bits of a received digital data stream for the presence of transmission errors;

(b) in response to step (a) detecting the presence of a transmission error, changing the baud rate from its current baud rate to a baud rate lower than the current baud rate, and monitoring said serial data communications link for digital data transmitted from said remote terminal device at said lower baud rate, but otherwise comparing the bit contents of said received digital data stream with a digital bit pattern associated with a prescribed reference character; and (c) in response to step (b) detecting a match between said received digital data stream and said digital bit pattern associated with said prescribed reference character, setting the baud rate of said serial communications device at the current baud setting for the remainder of the call, but otherwise changing the baud rate from its current baud rate to said lower baud rate, and repeating steps (a)–(c), until step (c) sets the baud rate of said serial communications device for the remainder of the call.

7. A serial data communications device according to claim 6, wherein, in said baud rate changing steps (b) and (c), in response to said current baud rate being the lowest baud rate at which said serial communications device is operative to communicate with a remote terminal device, said routine is operative to change the current, lowest baud rate to said default highest baud rate.

8. A serial data communications device according to claim 6, wherein, in each of steps (b) and (c), upon changing the baud rate from its current baud rate to said lower baud rate, said routine is operative to initiate a time-out period, and repeat steps (a)–(c) only in response to the receipt of a further digital message from said remote terminal within said time-out period, but otherwise said routine changes the baud rate from its current baud rate to said default baud rate and repeats steps (a)–(c).

9. A serial data communications device according to claim 8, wherein said time-out period is no less than the minimum character receive time for the lowest baud rate entry, allowing for character separation for every incoming character in order to ensure character identification in step (b).

10. A serial data communications device according to claim 6, wherein said communications controller includes memory which stores a plurality of baud rate representative codes associated with those baud rates at which said serial communications device is capable of communicating with a remote terminal device.

11. A method according to claim 1, wherein said transmission errors include errors in framing, parity and overrun.

12. A serial data communications device according to claim 6, wherein said transmission errors include errors in framing, parity and overrun.

* * * * *